United States Patent [19]
Goodrich

[11] Patent Number: 5,901,756
[45] Date of Patent: May 11, 1999

[54] FLEXIBLE WEAR SLEEVE

[76] Inventor: John J. Goodrich, 6360 Emerald Lake Dr., Troy, Mich. 48098

[21] Appl. No.: 08/922,976

[22] Filed: Sep. 3, 1997

[51] Int. Cl.⁶ .................................................... F16L 4/00
[52] U.S. Cl. ...................... 138/167; 138/156; 138/128; 138/118.1; 138/110; 248/205.2; 248/68.1
[58] Field of Search ..................................... 138/167, 156, 138/110, 118, 103, 128, 118.1, 120; 248/205.2, 68.1

[56] References Cited

U.S. PATENT DOCUMENTS

| | | | |
|---|---|---|---|
| 2,640,502 | 6/1953 | Powers | 138/110 X |
| 2,668,557 | 2/1954 | Hoelscher . | |
| 2,861,701 | 11/1958 | Bergsland et al. . | |
| 3,587,657 | 6/1971 | Staller | 138/156 |
| 4,422,478 | 12/1983 | Pentney et al. | 138/156 X |
| 4,900,596 | 2/1990 | Peacock | 138/110 X |
| 4,904,514 | 2/1990 | Morrison et al. . | |
| 4,920,235 | 4/1990 | Yamaguchi | 138/167 X |
| 4,929,478 | 5/1990 | Conaghan et al. | 138/110 X |
| 4,930,543 | 6/1990 | Zuiches | 138/110 |
| 4,944,973 | 7/1990 | Follette . | |
| 4,985,942 | 1/1991 | Shaw | 138/110 X |
| 5,134,000 | 7/1992 | Smythe et al. | 138/156 X |
| 5,246,254 | 9/1993 | LoJacono, Jr. et al. | 138/110 X |
| 5,269,068 | 12/1993 | Seitz . | |
| 5,277,227 | 1/1994 | Bradshaw et al. . | |
| 5,413,149 | 5/1995 | Ford et al. . | |
| 5,440,916 | 8/1995 | Stone et al. . | |
| 5,490,742 | 2/1996 | Cronk | 138/110 X |
| 5,522,433 | 6/1996 | Nygaard . | |
| 5,535,787 | 7/1996 | Howell . | |
| 5,651,161 | 7/1997 | Asta | 138/110 X |

*Primary Examiner*—Psatrick F. Brinson
*Attorney, Agent, or Firm*—Vanophem Meehan & Vanophem, P.C.

[57] ABSTRACT

A flexible wear sleeve for protectively surrounding one or more flexible cables or conduits leading to a spot-welding machine or an arc-welding machine or robot, the wear sleeve being formed by joining opposed edges of a flexible web to one another by a zipper connection. The flexible web is formed from a tough, durable material, such as a KEVLAR® material, and its opposed edges are also provided with elements of a VELCRO® connection to overlie the zipper and protect the zipper from contact with welding flash and/or foreign material. The flexible web is provided with at least one longitudinally extending pocket, and a flexible rod is inserted into the pocket to provide the flexible wear sleeve and the flexible cables or conduits protected thereby with an elastic memory to cause them to return to an undistorted configuration after removal of a distorting load therefrom and to provide a controlled bend radius thereto. The flexible web is also provided with a longitudinally extending plurality of laterally extending flexible straps, whose opposed edges are releasably joined to one another by a VELCRO® connection to bundle the cables or conduits passing through the wear sleeve and to hold the wear sleeve in a fixed position relative to the cables or conduits passing therethrough.

19 Claims, 2 Drawing Sheets

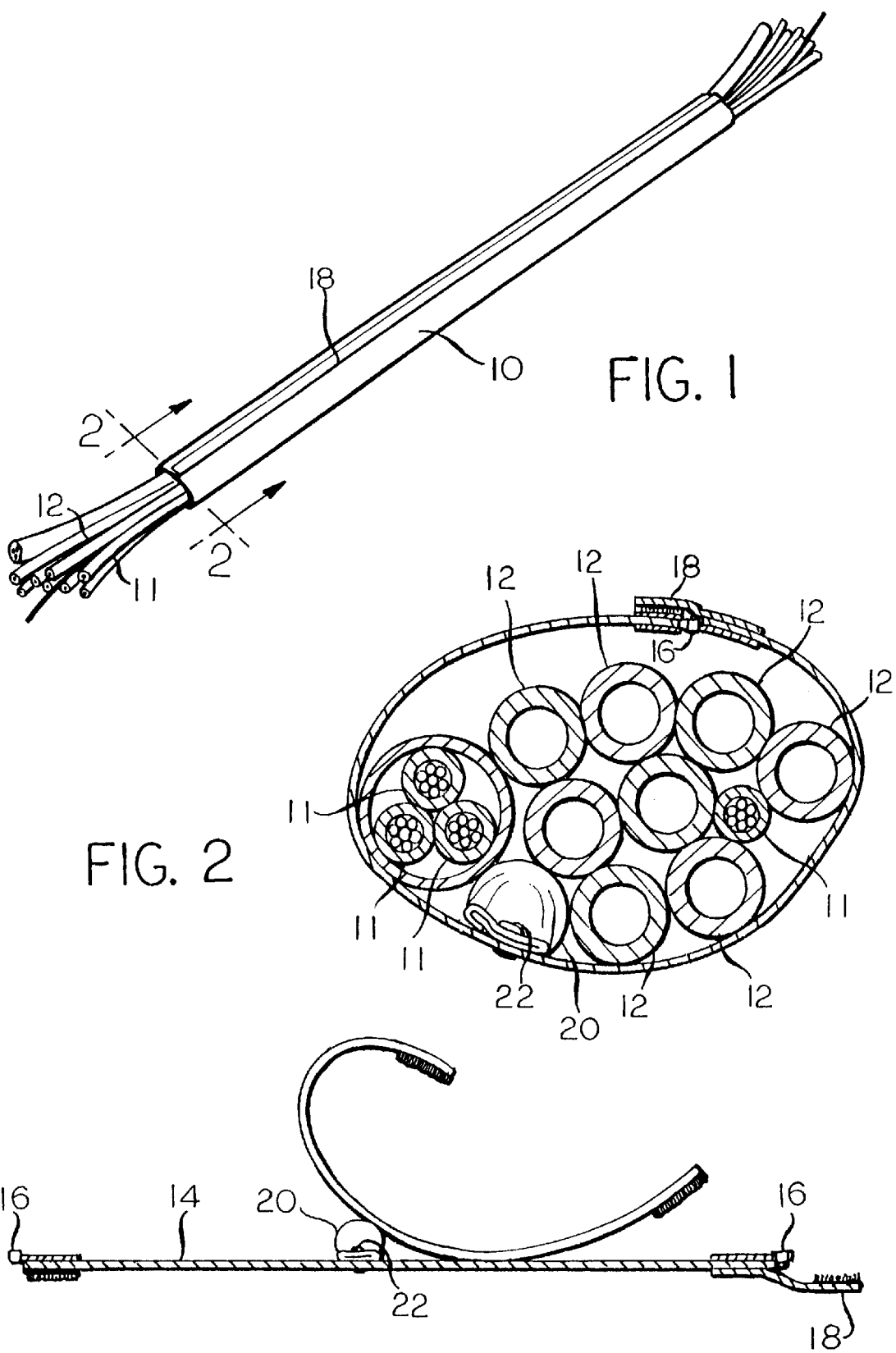

FLEXIBLE WEAR SLEEVE

BACKGROUND OF THE INVENTION

1. Field of The Invention

The invention relates to a flexible wear sleeve for protectively surrounding one or more fluid hoses and electrical cables, as used in connection with spot-welding or arc-welding robots and machines. More particularly, this invention relates to a wear sleeve of the foregoing character that can be provided with a variable degree of elastic memory.

2. Description of the Prior Art

Spot-welding and arc-welding robots and machines require electrical cables, water hoses and pneumatic and /or hydraulic hoses, and the cables, hoses and lines used to provide such utility sources must be flexible to accommodate the motions required of such welding robots and machines. The cables, lines and hoses used to provide such utility sources are subject to substantial wear and/or snagging, are also subject to being spattered by high temperature welding flash. Thus, it is desirable to protect such cables, lines and hoses by surrounding them with a flexible wear sleeve. In such an installation, it is also often desirable to provide the wear sleeve with a degree of elastic memory so that it and the cable(s) or conduit(s) protected thereby will return to their original shapes after removal of loads that cause them to distort therefrom. It is also often desirable to be able to bundle two or more cables or conduits surrounded by a single wear sleeve that is somewhat larger on its inner dimension than the outer dimensions of the cables or conduits surrounded thereby.

U.S. Pat. No. 5,413,149 (Ford et al) discloses a sleeve for use as a protector surrounding cables and conduits, but there is no disclosure in this reference that the sleeve described therein would be sufficiently rugged and temperature resistant to operate in a satisfactory manner to protect the flexible cables and conduits that lead to a spot-welding or arc-welding machine.

U.S. Pat. No. 5,535,787 (Howell) discloses a flexible cable holder for surrounding cables in an office or home environment. Again, there is no disclosure in this reference that the holder described therein would be sufficiently rugged and temperature resistant to operate in a satisfactory manner to protect the flexible cables and conduits that lead to a spot-welding or arc-welding machine.

SUMMARY OF THE INVENTION

The aforesaid and other problems associated with suitable protection of the flexible cables and conduits that lead to spot-welding and arc-welding machines or robots are overcome by the use of a flexible wear sleeve according to the present invention, which joins the opposed edges of a double-edged flexible web, after wrapping the flexible web around the cable(s) or conduit(s) to be protected thereby. The opposed edges of the flexible web are provided with VELCRO® hook and loop members that releasably engage one another, after the wear sleeve has been closed around the cable(s) or conduit(s) to be protected thereby, to protect the zipper from contact with high temperature welding flash.

The wear sleeve according to the present invention can also be provided with a plurality of spaced apart, double-ended straps that are sewn or otherwise incorporated on the inside surface thereof, whose ends can be releasably joined to one another, for example, by a VELCRO® connection, to help bundle a multiplicity of cables or conduits to be wrapped within such sleeve, when the interior dimension of the sleeve is somewhat greater than the exterior dimensions of the cables or conduits to be protected thereby. These bundling straps also serve to hold the wear sleeve in position when the wear sleeve is vertically oriented.

The wear sleeve according to the present invention can also be provided with a variable degree of elastic memory, to permit it and the cable(s) or conduit(s) surrounded by it to return to an undistorted shape at the removal of a distorting load therefrom, by incorporating a closed end pocket or pockets extending axially therealong, and by inserting a plastic or other flexible rod in the pocket. The flexible rod(s) also allows for a controlled bend radius of the wear sleeve.

Accordingly, it is an object of the present invention to provide an improved flexible wear sleeve for protectively surrounding and protecting one or more flexible cables, hoses or conduits, especially cables, hoses or conduits of such character that lead to an arc-welding machine or a spot-welding machine or robot. More particularty, it is an object of the present invention to provide a flexible wear sleeve of the foregoing character with a degree of elastic memory sufficient to permit such wear sleeve and the cable(s) or conduit(s) surrounded thereby to return to an undistorted shape after removal of any distorting loads therefrom and to provide a controlled bend radius to such wear sleeve. It is also an object of the present invention to provide a flexible wear sleeve of the foregoing character that will not shift from its installed position.

For a further understanding of the present invention and the objects thereof, attention is directed to the drawings and the following brief description thereof, to the detailed description of the preferred embodiment, and to the appended claims.

BRIEF DESCRIPTION OF THE DRAWINGS

FIG. 1 is a fragmentary perspective view of a flexible wear sleeve according to the preferred embodiment of the present invention, shown as surrounding a bundle of cables and hoses of the type used to deliver electrical power, compressed air and/or cooling water to a spot-welding machine or an arc-welding machine or robot;

FIG. 2 is a sectional view, at an enlarged scale, taken on line 2—2 of FIG. 1;

FIG. 4 is a sectional view of a double-ended web that is used to form the flexible wear sleeve of FIGS. 1 and 2, as taken on line 4—4 of FIG. 3, but with the cables removed.

DETAILED DESCRIPTION OF THE PREFERED EMBODIMENT

Figure 3:
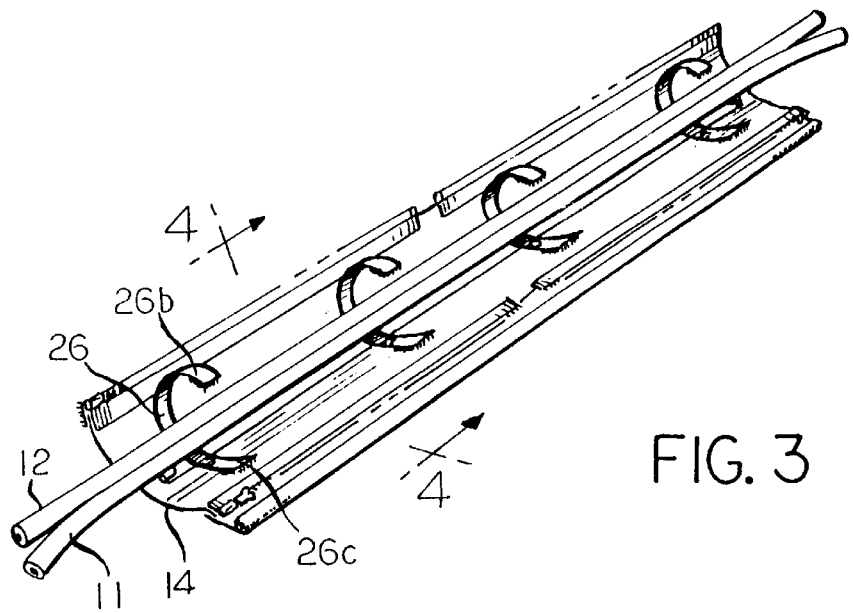
FIG. 3 is a perspective view showing a step in the forming of the flexible wear sleeve of FIGS. 1 and 2.

A flexible wear sleeve according to the present invention is identified by reference numeral 10, and is shown in FIGS. 1 and 2 as being used to surround and protect a pair of flexible cables 11 and hoses 12 of the type used to deliver electrical power, compressed air and/or cooling water to a spot-welding machine or an arc-welding machine or robot. The wear sleeve 10 is formed by joining the opposed edges of a double-edged flexible web 14 to one another, as shown in FIGS. 3 and 4. The wear sleeve 10 typically may have an internal diameter of at least two inches and a length of at least twelve inches.

The flexible web 14 is formed from a tough, durable, flexible material, such as a poly p-benzamide fibrous material sold under the trademark KEVLAR® or a heavy flexible leather, and its opposed, longitudinally extending edges are provided with the elements required to form a zipper 16. Through the use of the zipper 16, the flexible sleeve 10 may be readily formed around the cables 11 and hoses 12 from the flexible web 14; similarly, the zipper 16 permits the flexible sleeve 10 to be readily removed from the cables 11, 12. In any case, the zipper 16 may otherwise be subject to damaging contact from hot welding flash, or other debris or foreign material encountered in an industrial plant, in a spot-welding machine or arc-welding machine or robot, and this contact is prevented in connection with a flexible sleeve 10 by also providing the opposed edges of the flexible web 14 from which it is formed with hook and loop elements of a longitudinally extending VELCRO® cover 18 overlying the zipper 16.

Figure 5:
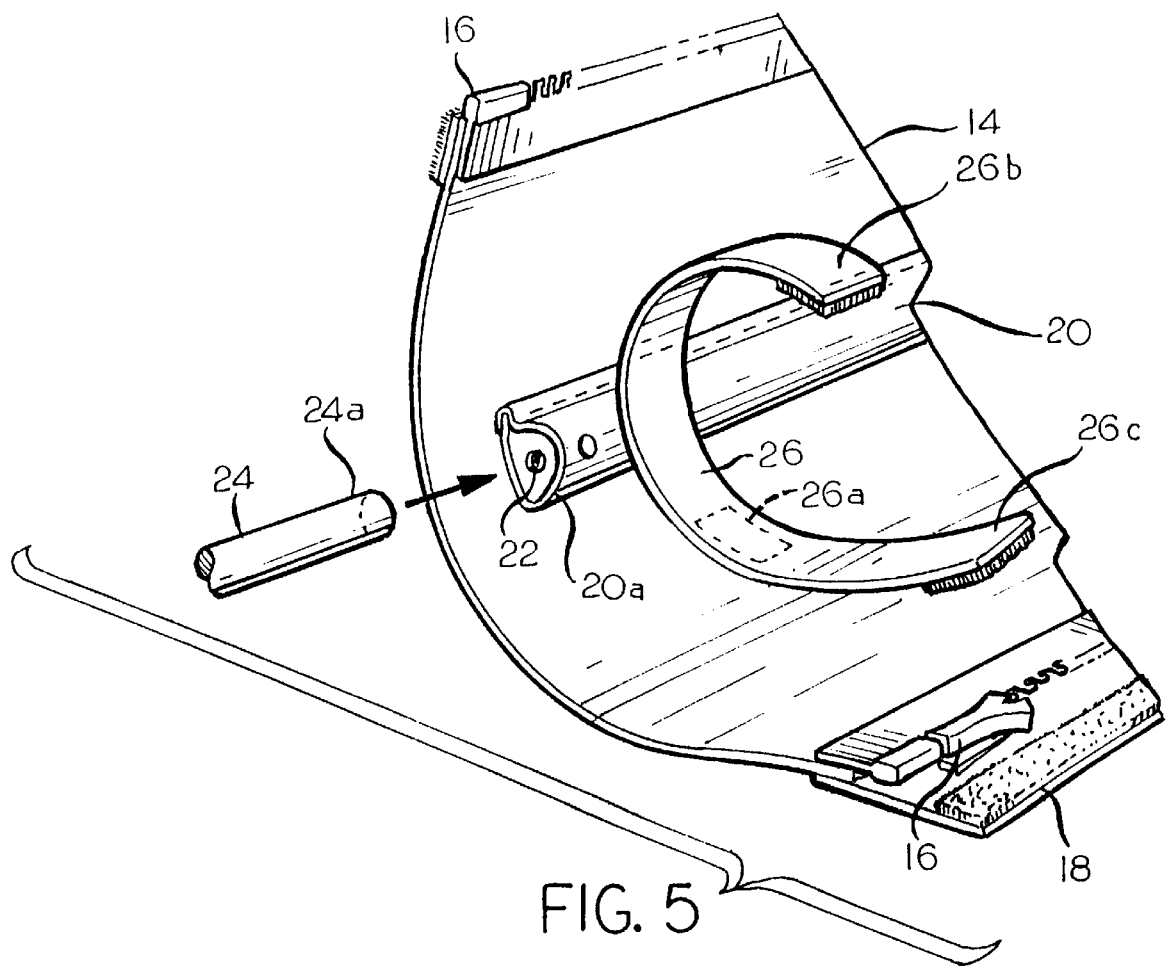
FIG. 5 is a fragmentary perspective view of a double-ended web as it is being formed into an alternate embodiment of a flexible wear sleeve according to the present invention.

Because of the inherent flexibility of the web 14, the wear sleeve 10 does not impart much elastic memory to the cables and hoses surrounded thereby, so that any distortion in the cables and hoses caused by a load imposed thereon will substantially remain after removal of such load. To correct this otherwise inherent characteristic in the wear sleeve 10, the web 14 is provided with at least one longitudinally extending pocket 20, the end 20a of which that is illustrated in FIG. 5 being open and being closable by a closing snap 22. The opposed end of the pocket 20, not shown, is closed by sewing or otherwise, and a flexible rod 24, such as a plastic rod, is inserted into the pocket 20 until its inner end 24a reaches or substantially reaches the closed end of the pocket 20. Thereafter the closing snap 22 is closed, the outer end of the rod 24, not shown, then being positioned at least slightly inwardly of the closing snap 22. The rod 24 has sufficient flexibility to be sufficiently distortable under the types of loads that are likely to be imposed on the cables and hoses with the sleeve 10 therearound, and yet has sufficient elastic memory to be able to cause the sleeve 10 and the cables and hoses to return to their original, undistorted conditions after removal of such load, as well as providing a controlled bend radius to the cables and hoses during the imposition of bending loads thereon.

The width of the web 14 is sufficient to form a sleeve 10 that is sufficiently large, in its interior dimensions, to accommodate a multiplicity of cables or flexible conduits whose combined exterior dimensions are somewhat smaller than the interior dimensions of the sleeve 10. If desired, the sleeve 10 can also be used to bundle the cables or conduits. To this end, the web 14 is provided with a longitudinally spaced apart series of laterally extending flexible straps 26, each of which is sewn or otherwise secured to the web 14 only at a central portion 26a of such strap. The free ends 26b, 26c of the strap 26 are, thereby, free to flex with respect to the web 14 and are provided with elements for forming a releasable VELCRO® hook and loop connection therebetween, to thereby securely bundle the cables or conduits passing through the sleeve 10. The free ends 26b, 26c of the strap 26 also serve to hold the sleeve 10 in a fixed axial position with respect to the cables or conduits passing therethrough when the wear sleeve 10 is oriented with its longitudinal central axis extending vertically.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

I claim:

1. A flexible wear sleeve for protectively surrounding at least a portion of at least one flexible cable, hose or conduit, said flexible wear sleeve comprising:

a double-edged web formed from a tough, durable, flexible material, said double-edged web further having a longitudinally extending, closeable pocket, and longitudinally extending flexible rod means for imparting a predetermined degree of elastic memory to said flexible wear sleeve, said rod means being contained within said closeable pocket, whereby said flexible wear sleeve and said at least one flexible cable hose or conduit surrounded thereby returns to an undistorted configuration after removal of a distorting load therefrom such that said flexible wear sleeve provides a controlled bend radius during imposition of a bending load thereon.

2. A flexible wear sleeve according to claim 1 wherein said web has a longitudinally extending, closable pocket therein, and further comprising:

longitudinally extending flexible rod means contained within said pocket for imparting a sufficient degree of elastic memory to said flexible wear sleeve to cause said flexible wear sleeve and the at lease one flexible cable or conduit surrounded thereby to return to an undistorted configuration after removal of a distorting load therefrom and to provide a controlled bend radius to said flexible wear sleeve during imposition of a bending load thereon.

3. A flexible wear sleeve according to claim 1 wherein said web is provided with a longitudinally extending plurality of laterally extending flexible straps, each of which is secured to said web at a central portion of said strap, each of said straps having an opposed pair of ends, and further comprising:

means for releasably joining said opposed pair of ends of each of said straps to one another.

4. A flexible wear sleeve according to claim 1 wherein said web is provided with a longitudinally extending plurality of laterally extending flexible straps, each of which is secured to said web at a central portion of said strap, each of said straps having an opposed pair of ends, and further comprising:

means for releasably joining said opposed pair of ends of each of said straps to one another.

5. A flexible wear sleeve according to claim 1 wherein said web is formed from a material comprising a poly p-benzamide fibrous material.

6. In combination with at least one flexible cable or conduit, a flexible wear sleeve protectively surrounding at least a portion of said at least one flexible cable or conduit, said flexible wear sleeve comprising:

a double-edged web having releasably joining opposing edges, said web being formed from a tough, durable, flexible material, said double-edged web further having a longitudinally extending, closeable pocket, and longitudinally extending flexible rod means for imparting a sufficient degree of elastic memory to said flexible wear sleeve, to cause said flexible wear sleeve and said at least one flexible cable or conduit surrounded thereby to return to an undistorted configuration after removal of a distorting load therefrom.

7. The combination according to claim 6 wherein said web has a longitudinally extending, closable pocket therein, and further comprising:

longitudinally extending flexible rod means contained within said pocket for imparting a sufficient degree of elastic memory to said flexible wear sleeve to cause said flexible wear sleeve and the at least one flexible cable or conduit surrounded thereby to substantially return to an undistorted configuration after removal of a distorting load therefrom.

8. A combination according to claim 6 wherein said web is provided with a longitudinally extending plurality of laterally extending flexible straps, each of which is secured to said web at a central portion of said strap, each of said straps having an opposed pair of ends, and further comprising;

means for reasonably joining said opposed pair of ends of each of said straps to one another, said opposed pair of ends of each of said straps being joined and circumscribing said at least one flexible cable or conduit.

9. A flexible wear sleeve according to claim 1 wherein said web is provided with a longitudinally extending plurality of laterally extending flexible straps, each of which is secured to said web at a central portion of said strap, each of said straps having an opposed pair of ends, and further comprising:

means for releasably joining said opposed pair of ends of each of said straps to one another, said opposed pair of ends of each of said straps being releasably joined to one another and circumscribing said at least one flexible cable or conduit.

10. A flexible wear sleeve according to claim 6 wherein said web is formed from a material comprising a poly p-benzamide fibrous material.

11. A method of providing protection for at least one flexible cable or conduit leading to a spot-welding machine or an arc-welding machine or robot, said method comprising the steps of:

providing a double-edged web formed from a tough, durable, flexible material, said double-edged web having a longitudinally extending closeable pocket;

positioning said at least one flexible cable or conduit adjacent a surface of said web;

wrapping said web around said at least one flexible cable or conduit;

inserting a longitudinally extending flexible rod within said pocket to impart a sufficient degree of elastic memory to said web to cause said wrapped web and said at least one flexible cable or conduit surrounded thereby to return to an undistorted configuration after removal of a distorting load therefrom and to provide a controlled bend radius to a sleeve formed from said web after removal of a bending load therefrom and;

releasably joining the edges of said web to one another.

12. The method according to claim 11 wherein said web has a longitudinally extending, closable pocket therein, and further comprising the step of:

inserting a longitudinally extending flexible rod within said pocket to impart a sufficient degree of elastic memory to said web, after said web has been wrapped around said at least one flexible cable or conduit, to cause said wrapped web and said at least one flexible cable or conduit surrounded thereby to return to an undistorted configuration after removal of a distorting load therefrom and to provide a controlled bend radius to a sleeve formed from said web after removal of a bending load therefrom.

13. The method according to claim 11 where in s aid web is provided with a longitudinally extending plurality of laterally extending flexible straps, each of which is secured to said web at a central portion of said strap, each of said straps having an opposing pair of ends, and further comprising releasably joining said opposed pair of ends of each of said straps to one another to circumscribe said at least one flexible cable or conduit positioned within said wrapped web.

14. The method according to claim 11 wherein said web is provided with a longitudinally extending plurality of laterally extending flexible straps, each of which is secured to said web at a central portion of said strap, each of said straps having an opposed pair of ends, and further comprising:

releasably joining said opposed pair of ends of each of said straps to one another to circumscribe said at least one flexible cable or conduit circumscribed by said wrapped web.

15. The method according to claim 11 wherein said double-edged web is formed from a material comprising a poly p-benzamide fibrous material.

16. The flexible wear sleeve according to claim 1 for use in a spot-welding machine or an arc-welding machine or robot wherein a zipper is provided for releasably joining opposed edges of said flexible web, and further comprising:

a VELCRO® connection overlying said zipper for protecting said zipper from contact with hot welding flash or other industrial plant debris or foreign material.

17. A combination according to claim 6 for use in a spot-welding machine or an arc-welding machine or robot wherein a zipper is provided for releasably joining opposed edges of said flexible web, and further comprising:

a VELCRO® connection overlying said zipper for protecting said zipper from contact with welding flash or other industrial plant debris or foreign material.

18. The method according to claim 11 wherein said step of releasably joining the edges of said web to one another comprises providing opposed edges of said web with elements of a zipper connection, and further comprising:

providing said opposed edges of said flexible web with elements of a releasable VELCRO® connection; and releasably joining the elements of said VELCRO® connection to one another in a position overlying said zipper connection to protect the zipper connection from hot welding flash or other industrial plant debris or foreign material.

19. A flexible wear sleeve for protectively surrounding at least a portion of at least one flexible cable hose or conduit, for use in a spot welding or arc welding machine or robot, said flexible sleeve comprising:

a double-edged web having releasably joining opposing edges, said web being formed from a tough, durable, flexible material, said double-edged web further comprising:

a longitudinally extending, closeable pocket;

a zipper releasably joining said opposed edges of said double-edged web; and a VELCRO® connection overlying said zipper for protecting said zipper from contact with hot welding flash or other industrial plant debris or foreign matter.

\* \* \* \* \*

UNITED STATES PATENT AND TRADEMARK OFFICE
CERTIFICATE OF CORRECTION

PATENT NO. : 5,901,756
DATED : May 11, 1999
INVENTOR(S) : Goodrich, John J.

It is certified that error appears in the above-identified patent and that said Letters Patent is hereby corrected as shown below:

Column 2, line 19, kindly delete "particularty" and insert ---- particularly ----.

Column 3, line 25, kindly delete "load . " and insert ---- load. ----.

Column 4, line 9, after "tough" kindly delete the comma " , " and insert a semi-colon ---- ; ----.

Column 4, line 11, after "pocket" kindly delete the comma " , " and insert a semi-colon ---- ; ----.

Column 4, lines 22 through 33, kindly delete in their entirety in accordance with the cancellation of Claim 2 in the amendment filed on June 2, 1998.

Column 4, line 42, kindly delete "1" and insert ---- 19 ----.

Column 4, line 60, after "pocket" kindly delete the comma " , " and insert a semi-colon ---- ; ----.

Column 5, lines 1 through 10, kindly delete in their entirety in accordance with the cancellation of Claim 7 in the amendment filed on June 2, 1998.

Column 5, line 17, kindly delete "reasonably" and insert ---- releasably ----.

UNITED STATES PATENT AND TRADEMARK OFFICE
CERTIFICATE OF CORRECTION

PATENT NO. : 5,901,756
DATED : May 11, 1999
INVENTOR(S) : Goodrich, John J.

It is certified that error appears in the above-identified patent and that said Letters Patent is hereby corrected as shown below:

Column 5, line 21, kindly delete " 1 " and insert ---- 19 ----.

Column 5, line 53, kindly delete "and;" and insert ----; and----.

Column 5, line 55 through Column 6, line 2, kindly delete in their entirety in accordance with the cancellation of Claim 12 in the amendment filed on June 2, 1998.

Column 6, line 3, kindly delete "where in" and insert ---- wherein----; kindly delete " s aid" and insert ---- said ----.

Claim 6, line 52, kindly delete "spot welding" and insert ---- spot-welding ----; kindly delete "arc welding" and insert ---- arc-welding ----.

Signed and Sealed this
First Day of February, 2000

*Attest:*

Q. TODD DICKINSON

*Attesting Officer*  *Acting Commissioner of Patents and Trademarks*